Patented July 1, 1930

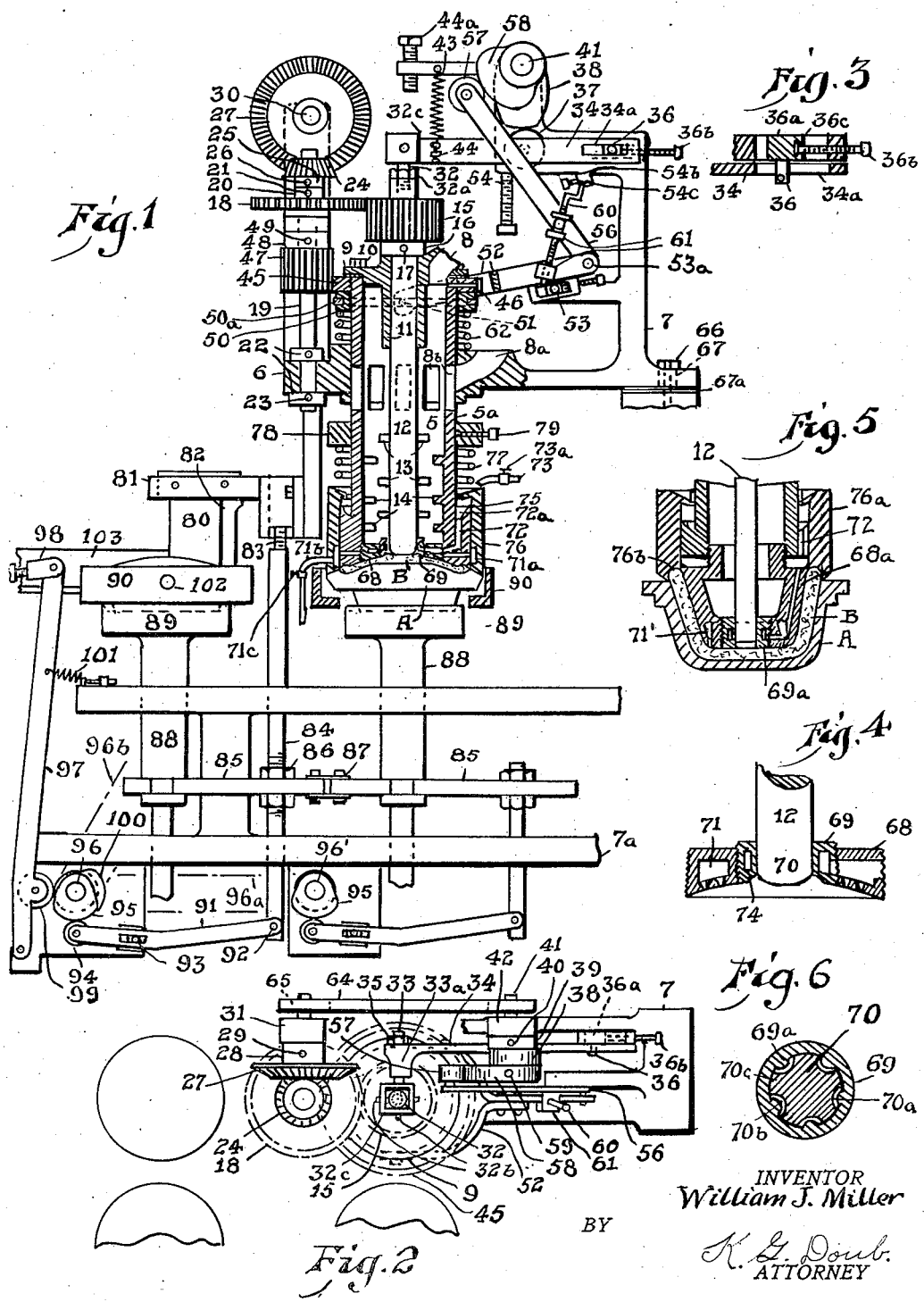

1,769,529

UNITED STATES PATENT OFFICE

WILLIAM J. MILLER, OF SWISSVALE, PENNSYLVANIA

METHOD OF AND APPARATUS FOR FEEDING AND FORMING PLASTIC MATERIAL IN THE MANUFACTURE OF POTTERY

Application filed February 5, 1927. Serial No. 166,179.

This invention relates to an improved method and means for feeding plastic material to molds in the manufacture of pottery.

The present application discloses subject-matter also disclosed in my copending applications, Serial Nos. 153,086 which has become Patent No. 1,703,316; 156,674 which has become Patent No. 1,739,981; 159,153 and 160,-997, filed, respectively, Dec. 7, 1926, Dec. 23, 1926, Jan. 5, 1927 and Jan. 13, 1927.

The present invention provides means whereby a predetermined or measured charge of plastic material may be extruded directly into or on a mold from a container cooperating with a plunger and various advantageous movements imparted to the container and plunger separately or in timed relation to segregate, preform and finally form the charge in what may be considered a single operation, or while the tray carrying the mold is in one position, and the mold may, if desired, be raised and rotated and lowered to cooperate with the container and plunger in the foregoing operations.

One object of the invention, therefore, is to provide combined means which will extrude, measure, segregate, preform and finally form or jigger a charge of plastic material.

Another object of the invention is to provide means for automatically extruding a predetermined and measured charge of plastic material directly onto or in a mold, and preforming and final forming or jiggering the charge by combined means while the mold is in one position.

A further object of the invention is to generally simplify mechanism of this class, and to also provide adjustments which will ensure proper timing and numerous advantageous operations of the various instrumentalities.

With the foregoing and other objects and advantages in view, the invention consists in the preferred construction and arrangement of the several parts, which will be more fully hereinafter described and claimed.

It may be desirable at times to use a profile and trimmer assembly or separate jiggering means, in which event I prefer to use an automatic jigger such as is disclosed in my copending applications Serial Nos. 143,994 and 148,872 which have become, respectively, Patent Nos. 1,750,762 and 1,757,132. However, any suitable type of jigger as well as mold-carrying or conveying means may be used, or these operations may be performed manually.

It is proposed to use any number of units as desired and arranged in parallel or in series, or in parallel and series, to feed any number of molds simultaneously or approximately simultaneously, by merely extending the supporting frame and connecting such operating parts as may be necessary to accommodate the additional units.

In the drawings:

Figure 1 is a side elevation, partly in section and broken through, of a preferred form of mechanism embodying the features of my invention and mounted to cooperate with a conveyor and jiggering means.

Fig. 2 is a top plan view.

Fig. 3 is an enlarged detail sectional view of one of the adjustment structures.

Fig. 4 is an enlarged sectional view of the forming and orifice members.

Fig. 5 is a sectional view of a modified structure which may be used to adapt the mechanism to deep molds.

Fig. 6 is a horizontal section through the lower extremity of the plunger and the orifice member, illustrating a modification in structure.

The numeral 5 designates a container, which is slidably and rotatably mounted in a supporting ring 6, formed as a part of or suitably attached to the stationary frame of the mechanism, generally designated at 7. Plastic material may be conveyed to the container through the medium of chutes 8 and 8$^a$. The upper chute 8 is preferably formed as a part of or attached to the container 5 and moves with the latter, while the lower chute 8$^a$ is stationarily mounted on the frame 7 and communicates with the container through a series of registering openings 8$^b$ formed around the side walls 5$^a$ of the container where the latter is encircled by the supporting ring 6. By this means plastic material may be fed to the container either through the chute 8 which moves with the container or the stationary chute 8ª, as found the most advantageous. The container may be closed by a cover 9, which may be bolted or otherwise suitably secured on the top of the container, as at 10, the said cover 9 being formed with a bearing and guide sleeve 11, and extending through this sleeve downwardly into the container is a rotatable and vertically reciprocable member or plunger 12, provided along its lower portion with feed blades 13, which may be suitably inclined and cooperate with ribs or projections 14, which may be oppositely inclined and formed integral with or secured to the wall 5ª of the container 5. At a suitable point above the cover 9 the plunger 12 preferably has adjustably secured thereon a gear 15 as by a hub 16 and screw 17, the gear 15 meshing with a gear 18, adjustably secured on a shaft 19 as by a hub 20 and screw 21. The shaft 19 extends vertically at one side of the container and is adjustably supported and has bearing at its lower extremity in a part of the frame 7 and is prevented from vertical displacement by upper and lower thrust or bearing collars 22, adjustably secured on said shaft as by screws 23. On the upper extremity of the shaft 19 above the gear 18 is a bevel or mitre gear 24, adjustably secured as by the hub 25 and screw 26, said gear 24 meshing with a bevel gear 27, adjustably secured as by a hub 28 and screw 29 on a shaft 30, which is rotatably mounted at one side of the frame of the mechanism in suitable bearings as at 31 and is intended to be of such length as to accommodate the number of units in operation, or separate shafts 30 may be provided for each unit and flexibly connected as by universal joints or the like, to permit individual adjustment of the units. The plunger 12 has adjustably threaded in the upper end thereof a headed swivel screw 32, which is secured in adjusted position by a lock nut 32ª. The head of this screw is cylindrical and formed with an annular groove, this groove providing a track for pins 32ᵇ projecting from a swivel boxing 32ᶜ of a bolt 33, which projects through a hub 33ª and the one extremity of a bar 34 and is rotatably retained in position by a nut 35. The opposite extremity of the bar 34 is adjustably pivoted to a part of the frame 7 as by the sliding block structure shown in detail by Fig. 3, the bar being slotted, as at 34ª and a cylindrical pin 36 extending through this slot and having a cotter key or the like inserted through the end thereof, so as to prevent the lever 34 from being displaced but at the same time permitting rotary and sliding motion of said lever or bar 34 on the pin 36. The opposite extremity of the pin 36 is secured in a block 36ª, Fig. 3, slidably mounted in the frame of the mechanism and movable in a longitudinal direction by adjusting a screw 36ᵇ, threaded through the frame and rotatably secured in one extremity of the block 36ª, as by forming one extremity of the bolt with an annular shoulder or head and mounting this head in a recess in the block, a retaining plate then being secured over this head or annular shoulder around the bolt, as shown at 36ᶜ. This structure provides for adjustment at any time, during operation of the machine or while at rest. At an intermediate point the bar 34 has rotatably mounted thereon a cam roller 37, which engages a cam 38, adjustably secured as by the hub 39 and screw 40 on a shaft 41, which may be rotatably mounted in suitable bearings at one side of the frame of the mechanism as at 42 and of such length, or flexibly connected so as to permit adjustment, as to accommodate the number of units in operation. The bar 34 works against the tension of a spring 43, adjustably secured at one extremity to a part of the frame of the mechanism, as at 44. The vertical reciprocation or movement of the bar 34 also may be adjusted and its uppermost point of reciprocation definitely established at any time, during operation of the mechanism or while at rest, by means of an adjusting screw 44ª, which may also be threaded into a part of the frame 7. The lowermost position or point of reciprocation of the plunger 12, also, may be established by adjustment of the swivel bolt 32 in the top of said plunger.

It will be seen that when power is applied to the shafts 30 and 41, the plunger 12 will be rotated and reciprocated vertically, or lowered and raised, and may be caused to dwell in its uppermost and lowermost positions, depending upon the adjustment of the various parts or the shape of the cam 38, and may also be adjusted at any time desired. The gears 15 and 18 may be so proportioned relatively to one another and adjusted that they will disengage at the up or down position and cause the plunger to rotate intermittently or only when in its lowermost position or uppermost position as desired. The speed of rotation of the plunger may be adjusted or varied by suitable interposed gearing or by replacing the gears 15 and 18 with gears of the desired size, and its direction of rotation may be reversed by interposing an idler gear between the gears 15 and 18, as will be obvious.

I may at times prefer to also continuously or intermittently rotate the container and reciprocate it vertically in timed relation to corresponding movements of the plunger, or the plunger and mold, and in the present instance I have shown one means of accomplishing this result.

On the upper extremity of the container 5 a gear 45 is adjustably secured, which is held in place by a pin 46, this gear 45 meshing with a pinion 47, adjustably secured on the shaft 19 as by the hub 48 and screw 49. The lower portion of the gear may be formed with a grooved collar 50, or this collar may be separately and adjustably secured as shown in the present instance, the groove providing a track or recess for a ring 50ª, into which studs or bosses 51, formed on each fork of a yoke 52, are socketed, the handle extremity of said yoke being adjustably pivoted on a part of the frame as at 53 by the sliding block connection heretofore described, to provide for adjustment at any time, during operation or while the mechanism is at rest. Also pivoted as at 53ª to the handle extremity of the yoke 52 is the one extremity of a lever 56, the said lever extending at an acute angle relatively to the handle extremity of the yoke 52 and has mounted thereon at its opposite extremity a cam roller 57, engaging the surface of a cam 58, also adjustably secured as by a screw 59 on the shaft 41. The adjustable pivot point 53 forms a fulcrum for the yoke 52 and lever 56, and to maintain the angle formed by these two members rigid and at the same time adjustable while in operation, I provide a threaded adjusting screw or rod 60, connecting with interiorly threaded and swiveled brackets 61 attached to the said lever 56 and handle extremity of the yoke 52. It will be seen that by adjusting the angle formed by the lever 56 and handle extremity of the yoke 52, the altitude of reciprocation of the container may be varied without changing the extent of its vertical travel and at the same time its lowermost and uppermost positions or points of reciprocation are simultaneously adjusted. The container is depressed against the tension of a suitable spring 62, inserted over the container between the supporting ring 6 and bearing at its upper extremity against the lower side of the collar 50, which, as hereinbefore specified, may be adjustably threaded on said container and serve to adjust the tension of the spring 62.

Provision is also made for adjusting, while in operation and while the mechanism is at rest, the topmost point of reciprocation of the container regardless of the cam 58, in the form of a screw 54, adjustably threaded in a part of the frame 7. By adjusting this screw 54 relatively to the handle extremity of the yoke 52, it will be seen that the topmost point of reciprocation of the container can be adjusted regardless of the cam 58.

A further adjustment while in operation may be had by mounting a screw bracket 54ᵇ and screw 54ᶜ on the frame 7, the said screw 54ᶜ being adjustable to contact with the bar 56. This screw serves to adjust the extent of reciprocation of the container. If, for instance, the screw 54ᶜ is adjusted to abut against the bar 56 and the rod or screw 60 adjusted to increase the angle formed by the bar 56 and handle extremity of the yoke 52, the bar 56 with its cam roller 57 will be prevented from moving nearer the cam 58 and the yoke 52 adjusted downward and thereby cause the container to reciprocate at a lower altitude. On the other hand, if the screw 54 is adjusted relatively to the handle extremity of the yoke 52, it will change the topmost point to which the container may rise without affecting the lowermost position to which it is depressed. The extent of travel of the container within the range of cam throw of the cam 58 may be increased or decreased by adjusting the screw 54ᶜ and also the screw 36ᵇ.

Briefly stated, it may be said that the screw 60 adjusts the altitude of reciprocation, the screw 54 the topmost point of reciprocation, and the screw 54ᶜ the extent of reciprocation, and by combining these three adjusting means, other desired results may be obtained.

From the foregoing it will be seen that vertical reciprocation may be imparted to both the plunger and container primarily through the cams 38 and 58, which may be adjusted on the shaft 41 to properly time and synchronize the raising and lowering of said plunger and container, and that relative rotation may also be imparted to said container and plunger primarily through the bevel gear 27 adjustably mounted on the shaft 30, and such rotation may also be timed and synchronized through the adjustments heretofore explained on the various gears, and both reciprocatory and rotary movements may be timed and synchronized. The gears 15 and 47 may be of any practical length or size, and in the event it is not desired to rotate the container or plunger, either one or both of said gears may be loosened on their respective shafts or removed, and likewise, reciprocation may be eliminated by disconnecting or loosening any one or both of the cams 38 and 58. It may be desirable to rotate the container or plunger only at their lowermost positions, and vice versa, in which event the gears 47 and 15 may be readily adjusted on the shaft 19 and plunger 12, or the plunger may be rotated continuously and the container intermittently, and vice versa, or one may be rotated faster than the other in the same direction, or the container and plunger may be rotated in opposite directions by mounting an intermediate idler gear between the drive and driven gears to transmit reverse motion thereto. It may be preferred to connect the shafts 30 and 41 by a flexible member or belt as at 64 adjustably mounted on variable speed pulleys or sheaves 65. The supporting frame 7 is adjustably mounted as by screw bolts 66 extending through enlarged openings 67 in the stationary frame of the mechanism and interposing shims 67ª. The shims 67ª may be wedge-shaped, so that the container and plunger may be mounted in a tilted or inclined position, for a purpose which will hereinafter be described.

The lower open extremity of the container 5 preferably has interior screw threads for removable and adjustable mounting of various sizes and types of forming or preforming members, one type of which is shown in detail in Fig. 4 and designated 68. In some instances it may be desired to form the bottom of this member 68 irregular, as for instance with grooves and ribs, to assist in more evenly spreading, kneading or distributing the charge over the mold. Approximately at its center this member 68 is formed with an inner screw-threaded opening for removable and adjustable insertion of various sizes and types of orifice members, as 69, having an opening or orifice through which the lower extremity 70 of the plunger 12 has vertical and rotary movement. The member 68 is formed with a chamber 71, for introduction and circulation of various fluid or other mediums, such, for instance, as hot or cold water, air, electric current, oil, coloring matter or any other fluid or medium that will prove of advantage in devices of this class. This fluid or medium may be introduced into the chamber 71, for instance, by a duct generally indicated at 72, which leads to the exterior and connects with suitable flexible members or pipes 73 having a regulating valve 73$^a$. The chamber 71 also leads into an analogous chamber 74 formed in the orifice member 69. An annular groove 72$^a$ is formed around the container to serve as what may be considered a reservoir for the duct 72 which opens into this groove at its upper extremity. Slidably and rotatably mounted over an annular shouldered portion 75 formed on the lower exterior portion of the container 5 is an annular press ring 76, vertically movable against the pressure of a spring 77, also encircling the container and at its upper end bearing against an adjustable collar 78, threaded or otherwise adjustably secured on said container and held in adjusted position by a screw 79. The upper flanged edge of the press ring 76 is in the present instance downwardly inclined, so that the fluid or other medium will flow from the flexible member 73 over the edge of the said ring 76 and into the groove 72$^a$ and thence into the duct 72, and to prevent the fluid from following the lower surface of the top edge of the press ring 76 and leaking between the ring and container during reciprocation and rotation of either or both, said lower surface is given a suitable upward inclination. A variable outlet is provided for the fluid by forming an annular groove 71$^a$ in the lower inner side of the ring 76, this groove being of such vertical extent as to always register with the chamber 71 during reciprocation of the ring 76 and communicating with a flexible outlet member or pipe 71$^b$ having a control or regulating valve 71$^c$. By this means the fluid or other medium that may be admitted to the chambers 71 and 74 through the duct 72 will be retained therein until dissipated or absorbed or circulated in said chambers and passed off through the flexible outlet member 71$^b$.

It will be seen that when the container descends, the press ring 76 will first contact with the rim of the mold and prevent the charge from being pressed out over the sides of the mold by the member 68, which operates to preform and finally form the charge, after which the said member 68 rises, followed by said press ring 76, and during the foregoing operation, the container and plunger may both be rotated in the same direction, or one rotated faster than the other in the same direction, or vice versa, or have any other of the movements imparted thereto of which they are capable and which may be found most advantageous in forming the article of pottery desired to be produced. The rotation of the screw blades may be adjusted to partly extrude a measured or predetermined charge and then the plunger descend through the orifice opening and fully extrude the charge onto or in the mold, or press the neck of the charge through the orifice opening, and as the plunger may be rotated during this operation and likewise the container with the member 68 on the bottom thereof, the neck will be merged into the bulk of the charge and preformed and finally formed as a part thereof. The bottom of the plunger may be shaped to form the desired bottom portion of the finished article, and as the plunger may be rotated during both its descent and rise, there will be no tendency of the charge to adhere thereto, and any excess of plastic material or deficiency of the latter that may be due to misadjustment of the lowermost point of reciprocation of the plunger will be absorbed or compensated for in the depth of the cavity inside the raised rim generally formed on the bottom of ware of this class.

It will therefore be seen that the plunger acts to segregate the charge in a superior manner without the aid of a knife or shear and neither will it be necessary to retract or lift the material in the container nor provide for removal of excess material. The molds may during this time be elevated and rotated or rotated and not elevated and vice versa. The extreme elevation dwell of the mold and/or depression dwell of the former member 68 may be continued during the extruding and forming operations or may be given a number of limited reciprocations, as may be found most advantageous to produce the desired results, by substituting cams having the proper surface contour. The charge may be partly or wholly extruded by imparting rotary motion to the blades 13, or combined rotary and vertical motion, or vertical reciprocation alone and the final compacting done by the tip of the plunger moving down through the orifice, or the entire charge may in some instances be extruded by the plunger tip, depending upon the class of ware being produced and as found most advantageous.

The plunger extremity 70 and inner wall of the orifice member or either or both may be tapered and of varying shapes as, for example in Fig. 6, which shows the plunger extremity formed with tapered flutes 70ª and the inner wall of the orifice member with correspondingly tapered ribs 69ª, a space 70ᵇ being formed by this construction which gradually closes as the plunger descends. The vertically straight portion 70ᶜ of the plunger extremity between the flutes 70ª acts as a centering means for the plunger in the orifice. In this instance it will be understood that the container and plunger may be adjusted to rotate in the same direction and at the same speed or remain non-rotating and the mold rotated. The space 70ᵇ permits back leakage or oozing into the container of any excess of plastic material that may be due to misadjustment of the extruding means, and the flute and rib construction serves to eliminate the scar on the ware that may result from the line of jointure between the plunger and orifice member.

It may be desirable to form the inner wall of the orifice member smooth or omit the ribs 69ª and form the flutes in the plunger extremity of the proper size to permit back leakage, to permit rotation of the plunger independently of the container.

The mechanism may be so adjusted that approximately the proper amount of plastic material is extruded to form the article of pottery being manufactured, it being understood that clay of a uniform consistency is generally supplied in the commercial production of this class of ware. Extrusion may take place partly before either the press head or member 68 and ring 76 or the lower extremity of the container are lowered or the mold elevated or both lowered and raised simultaneously, and the plunger descend and fill all cavities that may be present in the charge.

If it is desired to raise and rotate and lower the molds and also use a separate additional final profile and trimmer assembly, I prefer to employ the structure disclosed by my copending applications Serial Nos. 143,994 and 148,872, but this structure may be varied as required and found necessary to adapt it to the article of pottery being manufactured. The profile and trimmer assembly disclosed for the purposes of illustration in the present instance may be readily understood by referring to my copending applications above noted, and a general description thereof should suffice. The assembly generally comprises a profile 80, adjustably mounted on a support 81. The support and profile being slidable vertically in guides attached to a bracket, which may be adjustably secured to a part of the frame. The support is limited in its downward movement by an adjustable stop plate and moves upwardly against the tension of a spring. A trimmer 82 is adjustably secured on a stationary holder, not shown, to cooperate with the profile 80. The profile support 81 has an adjustable screw bolt 83 inserted in the lower portion thereof, which is adapted to intermittently contact with a pitman 84, to raise and lower the profile in timed relation to mechanism for shifting the molds. It will be understood that the spindles 88 may be rotated intermittently or continuously by any suitable means such, for instance, as is shown in my copending applications above noted. The pitman 84 extends downwardly and adjustably supports cross forks 85 as at 86, the cross forks 85 being independently and adjustably connected as at 87 and also supporting the spindles 88, which terminate in chucks 89, which are adapted to rise through the openings in the trays 90 carrying the molds and support the latter while being subjected to the extruding, preforming and final forming, jiggering or other operations. Each cross fork is shown as separately connected for independent raising and lowering of the chuck and spindles by levers 91, pivoted at one extremity as at 92 to the pitman 84 and adjustably fulcrumed by means of the sliding block structure heretofore described as at 93, the opposite extremities of the levers 91 having rotatably mounted thereon cam rollers 94, which engage cams 95, adjustably secured on shafts 96 and 96', which may be connected by flexible members 96ª and pulleys or sheaves or be operated independently as desired. The foregoing structure as a whole is mounted on the lower frame 7ª of the mechanism.

To impart a step-by-step movement to the flexible member or conveyor on which the mold-carrying trays 90 are pivotally mounted, I prefer to adopt the structure also disclosed by my copending application Serial No. 148,872. For the purposes of illustration in the present instance I show a lever 97 adjustably pivoted at its lower extremity to a part of the frame 7ª and at one side of its upper extremity provided with an adjustable length pawl 98. Rotatably mounted on the lever 97 is a cam roller 99, which is maintained in continual engagement with a cam 100, which may be adjustably secured on the shaft 96, by a spring 101, adjustably connected at one extremity to a part of the frame 7ª and at its opposite extremity to the said lever 97. When the cam 100 is rotated it will actuate the lever 97 with its pawl 98, and the latter will abut against the projecting trunnion 102 of the tray 90 during its forward movement and impart a step-by-step movement thereto on the track 103, and on the return movement of the lever 97 the pawl 98 will ride over the trunnion and drop by gravity sufficiently to abut against the trunnion 102 for a succeeding forward step movement of the conveyor, as has been fully explained in my prior application above noted. The spindles and chucks may be independently rotated by motors, not shown, suitably mounted and adjustably connected to the spindles as by cone pulleys or other means for speed variation, for instance as shown in my copending application Serial No. 159,153, filed Jan. 5, 1927, hereinbefore referred to.

From the foregoing the operation of the mechanism should be readily understood. Power is preferably applied to the drive shaft 96 and transmitted to the shafts 41 and 30 by flexible members 96$^b$, (partly shown by dot and dash lines for the purposes of illustration), in timed relation, or in some instances it may be desired to drive each shaft 96, 30 and 41 separately or the shafts 30 and 41 connected and driven in timed relation and the lower mechanism driven separately. The mechanism may be so timed and synchronized that the plunger will, for example, first rotate and extrude a predetermined or measured charge through the orifice member opening, the plunger at this time being in normal position or so that the lower extremity thereof clears the orifice. The plunger may be adjusted to descend at the proper moment and close the orifice and segregate the charge and press the neck thereof down to the level of the bulk of the charge. During these movements of the plunger, the container may, for example, be so timed as to rotate in the same direction as the plunger but at a slower speed, and the mold raised and/or both the container and plunger lowered, or the mold raised and rotated and the container remain inert, as has been heretofore described, or any number of advantageous movements may be imparted to the container and plunger and jiggering mechanism in synchronism. The charge may be confined between the mold and press member 68 and the press ring 76 may first contact and rotate with the rim of the mold and prevent the charge from being pressed out over said rim by the said member 68. The container may be rotated and preform or finally form the charge and then raised or the mold lowered onto the tray, the plunger rising above the orifice to clear the latter for the succeeding charge. The mold with its charge may then be moved a step forward and subjected to the profile and trimmer or final jiggering operation or the charge considered as finally formed.

By forming the shims 67$^a$ wedge-shaped and mounting the container at an incline, the member 68 may be caused to rotate at an angle relatively to the mold surface when feeding and forming the charge, so that the latter will be subjected to a kneading action, the charge in this instance being confined between two rotating surfaces which act to press or squeeze the clay on one side and relieve the charge of pressure on the opposite side thereof. When producing relatively thin ware, the feeding of the clay will also be facilitated by providing a cavity which may be greater on one side than on the other, the clay being extruded into the enlarged portion of the cavity and then gradually pressed into the desired thickness of the ware.

This kneading action may also be substantially duplicated by adjusting the container and plunger relatively to the mold so that the axes of rotation of these members are out of alinement and which adjustment may be effected through the medium of the enlarged openings 67 for the bolts 66, this method being preferred in regard to deep ware.

Fig. 5 shows a modification in structure which may be used to adopt the mechanism for deep molds such, for instance, as are used in the manufacture of bowls, cups, etc. In this instance 68$^a$ designates the press and preforming or final forming member, removably and adjustably threaded into the lower extremity of the container as in the form first described. The orifice member 69$^a$ may be of the form shown and removably and adjustably threaded in the member 68$^a$ at the lower portion thereof. A chamber 71' is formed in the member 68$^a$ and communicates with the chamber in the orifice member and is fed by the duct 72 as in the form first described. The press ring in this instance is designated 76$^a$ and is shaped to form a bead or rounded edge on the brim of the ware, as at 76$^b$, or may be shaped to provide any contour of rim desired. The mold is indicated at A and the clay or charge at B in the drawings in both instances.

What is claimed as new is:

1. In mechanism of the class specified, a container for plastic material provided with an outlet and a chambered forming member associated with said outlet.

2. In mechanism of the class specified, a container for plastic material provided with an outlet, a chambered forming member associated with said outlet, and means for introducing a fluid medium to said chamber.

3. In mechanism of the class specified, a container for plastic material provided with an outlet, a chambered orifice member encompassing said outlet, and a reciprocating extruding member in said container.

4. In mechanism of the class specified, in combination, a mold, a container for plastic material provided with an outlet, a chambered forming member associated with said outlet, means for extruding a charge of material onto said mold through said outlet, and means for introducing a fluid medium to the charge through said forming member.

5. In mechanism of the class specified, a container for plastic material, a forming member associated with said container, and a reciprocating plunger in said container adapted to extrude the plastic material through said preforming member.

6. In mechanism of the class specified, in combination, a mold, a container for plastic material provided with an outlet, and means adapted to cooperate with the container and mold for confining a charge of material therebetween and limit and measure said charge.

7. In mechanism of the class specified, in combination, means for extruding a charge of plastic material directly into or on a mold, and a charge-confining member applied to said extruding means and adapted to cooperate with the mold to form a cavity into which the charge is extruded.

8. In mechanism of the class specified, in combination, a container for plastic material provided with an outlet, a charge-confining member applied around said outlet, a mold, said member being adapted to cooperate with said mold to form a chamber shaped in conformity with the ware to be produced, and means in said container for extruding the material therefrom into said chamber.

9. In mechanism of the class specified, a container for plastic material, and means removably associated with the lower extremity of said container for confining a charge of plastic material and conforming it to the contour of a mold.

10. In mechanism of the class specified, in combination, a container for plastic material provided with an outlet, a forming member encompassing said outlet and a charge-confining member encompassing said forming member, a mold, said forming member and charge-confining member being adapted to cooperate with the mold to partially form the walls of a cavity shaped in conformity with the ware to be produced, and a reciprocating member in said container adapted to extrude a charge of material through said outlet into, and complete the walls of, said cavity.

11. In mechanism of the class specified, an extruding member and an orifice member shaped to permit back extrusion of excess material.

12. In mechanism of the class specified, an extruding member and an orifice member respectively formed with cooperating flutes and ribs to permit back extrusion of excess material.

13. In mechanism of the class specified, a container for plastic material, a preforming and forming member adjustably applied to the outlet extremity of said container, a press ring also applied on the outlet extremity of said container, and an extruding member disposed in said container and having the outlet extremity thereof shaped to permit back extrusion of excess material.

14. In mechanism of the class specified, means for extruding a charge of plastic material directly into or on a mold, and forming the charge by imparting rotation to the extruding means.

15. In mechanism of the class specified, combined means for extruding a charge of plastic material directly into or on a mold, and preforming and final forming the charge by imparting rotation to the extruding means.

16. In mechanism of the class specified, combined means for extruding a predetermined charge of plastic material directly into or on a mold, segregating the charge, and preforming the charge by imparting rotation to the extruding means.

17. In mechanism of the class specified, a container for plastic material provided with a discharge orifice, means for extruding the material in charges through said orifice, a forming member encompassing said orifice, and means for rotating said container to shape the charges.

18. In mechanism of the class specified, a reciprocable and rotatable container and plunger which cooperate to extrude, segregate and form a charge of plastic material.

19. In mechanism of the class specified, a container for plastic material, a plunger in said container, and means for reciprocating and rotating the container and plunger to extrude, segregate and preform a charge of plastic material.

20. In mechanism of the class specified, a container for plastic material, a plunger in said container, and means for reciprocating and rotating the container and plunger to extrude a measured charge directly into or on a mold and segregate and form said charge.

21. In mechanism of the class specified, a container for plastic material, a rotatable and reciprocable extruding means in said container, and means removably and adjustably applied to the lower extremity of the container for preforming a charge of plastic material.

22. In mechanism of the class specified, a container for plastic material, and a reciprocable and rotatable plunger in said container adapted to extrude and segregate measured charges of plastic material.

23. In mechanism of the class specified, a container for plastic material, a removable and adjustable press member, a removable and adjustable orifice member, and extruding means in said container adapted to descend through the orifice member and segregate and assist in preforming a charge of plastic material.

24. In mechanism of the class specified, a container for plastic material, a chambered preforming member adjustably applied to the lower extremity of said container, a chambered orifice member adjustably applied in said preforming member, and extruding means in said container adapted to descend through the said orifice member to segregate a charge of plastic material.

25. In mechanism of the class specified, a container for plastic material, a preforming and forming member adjustably applied to the lower extremity of said container and having a chamber formed therein, a press ring also applied on the lower extremity of said container, an extruding member in said container, and means for rotating and reciprocating both the container and extruding means to extrude a measured charge of plastic material and segregate, preform and finally form said charge.

26. In mechanism of the class specified, a vertically reciprocable and rotatable container for plastic material, preforming means removably and adjustably associated with said container, a vertically reciprocable and rotatable plunger in said container, and means for imparting movement to the container and plunger, said means being adjustable to synchronize and vary the relative reciprocation and rotation of said container and plunger.

27. In mechanism of the class specified, a vertically reciprocable and rotatable container for plastic material, preforming and forming means removably and adjustably associated with the lower extremity of said container, a vertically reciprocable and rotatable extruding, measuring and segregating means in said container, and means for operating said container and extruding, measuring and segregating means separately or in timed relation at varying speeds to extrude a measured charge of plastic material and segregate, preform and finally form said charge.

28. In mechanism of the class specified, a container for plastic material, a chambered preforming member removably and adjustably applied to the bottom of said container, a press ring slidably and rotatably mounted on the lower extremity of said container, the lower extremity of the container being also provided with a duct for conveying a fluid medium to said chamber and said preforming member being provided with means for exuding said fluid medium through the side and bottom walls thereof.

29. In a machine for the manufacture of articles of pottery, the combination with a conveyor for molds, a reciprocable and rotatable container and plunger, preforming and forming means removably and adjustably associated with said container, jiggering means, and means for operating the container and plunger and jiggering means in timed relation to extrude, segregate, preform and finally form a charge of plastic material.

30. In a machine for the manufacture of pottery, the combination with a conveyor for molds, a vertically reciprocable and rotatable container, vertically reciprocable and rotatable extruding means in said container, chambered preforming and orifice members removably and adjustably applied to the lower extremity of said container, means for raising and rotating and lowering the molds, and means for imparting a step-by-step movement to the conveyor.

31. In a machine for the manufacture of pottery, the combination with a conveyor for molds, a vertically reciprocable and rotatable container, vertically reciprocable and rotatable extruding means in said container, means for operating said container and extruding means and means for adjusting the operating means while either in operation or at rest, chambered preforming and orifice members removably and adjustably applied to the lower extremity of said container, means for raising and rotating and lowering the molds, and means for imparting a step-by-step movement to the conveyor.

32. In a machine for the manufacture of pottery, the combination with a vertically reciprocable and rotatable container and plunger, chambered preforming and orifice members, means for adjusting the vertical reciprocation of said container and plunger, jiggering means, means for imparting a step-by-step movement to the conveyor, and means for operating the container, plunger, jiggering means and said last-named means in timed relation.

33. In a machine for the manufacture of pottery, the combination with a vertically reciprocable and rotatable container and plunger, chambered preforming and orifice members, means for adjusting the vertical reciprocation of said container and plunger while in operation, jiggering means, means for imparting a step-by-step movement to the conveyor, and means for operating the container, plunger, jiggering means and said last-named means in timed relation.

34. In mechanism of the class specified, a container for plastic material provided with a discharge orifice, means for extruding the material in charges through said orifice, means for reciprocating said container, and means for adjusting while in operation the extent of reciprocation of said container.

35. In mechanism of the class specified, a container for plastic material provided with a discharge orifice, means for extruding the material in charges through said orifice, means for reciprocating said container, and means for adjusting while in operation the altitude of reciprocation of said container.

36. In mechanism of the class specified, a container for plastic material, a plunger in said container, means for reciprocating and rotating said container and plunger, and means for adjusting while in operation the altitude of reciprocation of said container.

37. In mechanism of the class specified, a container for plastic material, a plunger in said container, means for reciprocating and rotating said container and plunger, and means for adjusting, while in operation, the altitude of reciprocation of said container and plunger.

38. In mechanism of the class specified, a container and plunger, means for reciprocating said container and plunger, and means for adjusting, while in operation, the extent of reciprocation of said container and plunger.

39. In mechanism of the class specified, a container and plunger, means for reciprocating said container and plunger, and means for adjusting, while in operation, the lowermost plane of reciprocation of said container.

40. In a machine for the manufacture of pottery, the combination with a vertically reciprocable and rotatable container and plunger, preforming and orifice members, jiggering mechanism including a chuck and spindle, means for raising and lowering said chuck and spindle, and means for adjusting the plane of reciprocation of said container and plunger and the plane of rise of said chuck to confine, preform and finally form a charge of plastic material.

41. The method of feeding plastic material to molds, which consists in progressively moving a mass of the plastic material in a container toward and through the outlet opening of the latter, and segregating the material in charges through intermittent closure of said opening.

42. The method of feeding plastic material to molds in the manufacture of pottery, which consists in progressively moving a mass of the material in a container towards and through the outlet opening of the latter, and segregating the material in charges and preforming the charges through intermittent closure of said opening and rotation of said container.

43. The method of feeding plastic material to molds in the manufacture of pottery, which consists in progressively moving a mass of the material in a container toward and through the outlet opening of the latter, and segregating the material in charges and preforming and final forming the charges through intermittent closure of said opening and simultaneous rotation of the container.

44. The method of feeding plastic material to molds in the manufacture of pottery, which consists in progressively moving a mass of the material in a container toward and through the outlet opening of the latter, and segregating the material in charges and preforming and final forming the charges through intermittent closure of said opening and relative rotation of the container and mold.

45. The method of feeding plastic material to molds in the manufacture of pottery, which consists in extruding a charge of plastic material directly into or on a mold and segregating and preforming said charge by reciprocation and rotation of the source of extrusion.

46. The method of feeding plastic material to molds in the manufacture of pottery, which consists in extruding a charge directly into or on a mold, and limiting and segregating said charge by reciprocation of the means of extrusion.

47. The method of feeding plastic material to molds in the manufacture of pottery, which consists in extruding plastic material from a container by a plunger, and segregating, preforming and final forming by reciprocation and rotation of the container and plunger.

48. The method of feeding plastic material to molds in the manufacture of pottery, which consists in extruding a charge from a container directly into or on a mold by rotating a plunger, and segregating and preforming the charge by relative reciprocation of the container and plunger.

49. The method of feeding plastic material to molds in the manufacture of pottery, which consists in extruding a charge from a container by rotating a plunger, and segregating, preforming and final forming the charge by relative reciprocation and rotation of the container and plunger.

50. The method of feeding plastic material to molds in the manufacture of pottery, which consists in extruding a charge from a container directly into or on a mold by rotating a plunger, and segregating and preforming the charge by relative reciprocation and rotation of the container, plunger and mold.

Signed by me this 3rd day of February, 1927.

WILLIAM J. MILLER.